(12) United States Patent
Corbefin (10) Patent No.: US 10,805,299 B2
(45) Date of Patent: Oct. 13, 2020

(54) INTERFACE MANAGER DEVICE IN AN AIRCRAFT

(71) Applicant: Airbus Operations S.A.S., Toulouse (FR)

(72) Inventor: Jean-Philippe Corbefin, Mondonville (FR)

(73) Assignee: Airbus Operations S.A.S. (FR)

(*) Notice: Subject to any disclaimer, the term of this patent is extended or adjusted under 35 U.S.C. 154(b) by 175 days.

(21) Appl. No.: 16/031,093

(22) Filed: Jul. 10, 2018

(65) Prior Publication Data

US 2019/0036927 A1 Jan. 31, 2019

(30) Foreign Application Priority Data

Jul. 25, 2017 (FR) ...................................... 17 57036

(51) Int. Cl.
*H04L 29/06* (2006.01)
*H04L 12/24* (2006.01)
(Continued)

(52) U.S. Cl.
CPC ........ *H04L 63/10* (2013.01); *H04L 12/40013* (2013.01); *H04L 41/08* (2013.01);
(Continued)

(58) Field of Classification Search
CPC ..... H04L 63/10; H04L 63/0227; H04L 67/12; H04L 12/40013; H04L 12/40273; H04L 41/08; H04L 41/0806; G06F 9/44505
(Continued)

(56) References Cited

U.S. PATENT DOCUMENTS 7,095,747 B2 * 8/2006 Sarmiento ......... H04L 29/12009
370/352
7,117,241 B2 * 10/2006 Bloch .................. H04Q 3/0025
709/201
(Continued)

FOREIGN PATENT DOCUMENTS

EP 3 131 232 A1 2/2017

OTHER PUBLICATIONS

NPL Search Results (Year: 2020).*
(Continued)

*Primary Examiner* — Syed A Zaidi
(74) *Attorney, Agent, or Firm* — Lerner, David, Littenberg, Krumholz & Mentlik, LLP (57) ABSTRACT

An interface manager device interconnects peripheral devices to a network of ACD type or of AISD type of an aircraft, and includes: a first data interface for connecting it to the network; a first electrical power supply interface for connecting it to a general electrical power source; second data interfaces and second electrical power supply interfaces, for connecting it to the peripheral devices, which are deactivated by default. The interface manager device is configurable via a configuration interface so as to selectively authorize connections between the second data interfaces and the first data interface, and to selectively authorize connections between the second electrical power supply interfaces which are associated with them and the first electrical power supply interface, and to activate the second interfaces concerned. The interface manager device propagates a received data packet when said data packet relate to an authorized connection and deletes said data packet otherwise.

12 Claims, 4 Drawing Sheets

(51) Int. Cl.
*H04L 12/40* (2006.01)
*G06F 9/445* (2018.01)
*H04L 29/08* (2006.01)

(52) U.S. Cl.
CPC ...... *H04L 41/0806* (2013.01); *H04L 63/0227* (2013.01); *H04L 63/08* (2013.01); *G06F 9/44505* (2013.01); *H04L 67/12* (2013.01); *H04L 2012/40273* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 7,907,945 | B2* | 3/2011 | Deprun | H04W 48/10 |
| | | | | 455/432.1 |
| 10,057,388 | B2* | 8/2018 | Pei | H04B 3/54 |
| 2002/0065594 | A1* | 5/2002 | Squires | B60R 16/0315 |
| | | | | 701/48 |
| 2004/0243837 | A1* | 12/2004 | Fredette | H04L 63/0442 |
| | | | | 726/14 |
| 2006/0129863 | A1* | 6/2006 | Kouropoulos | G06F 1/266 |
| | | | | 713/340 |
| 2007/0155512 | A1* | 7/2007 | Wells | G07F 17/32 |
| | | | | 463/46 |
| 2009/0016216 | A1* | 1/2009 | Ballard | B60R 16/03 |
| | | | | 370/230 |
| 2012/0173174 | A1* | 7/2012 | Gaarder | G01R 31/086 |
| | | | | 702/58 |
| 2013/0114452 | A1* | 5/2013 | Raoul | H04W 48/02 |
| | | | | 370/252 |
| 2015/0163056 | A1* | 6/2015 | Nix | H04L 63/08 |
| | | | | 380/46 |
| 2015/0239120 | A1* | 8/2015 | Yamamoto | H04L 67/10 |
| | | | | 700/247 |
| 2017/0097621 | A1* | 4/2017 | Ackmann | G05B 19/0426 |

OTHER PUBLICATIONS

Jinying Zhang et al: "Power recovery from data line in avionic applications", Microelectronics (ICM), 2012 24th International Conference on Microelectronics, IEEE, Dec. 16, 2012, pp. 1-4, XP032337810.

Sergio D. Penna, "Networking in Modern Avionics: Challenges and Opportunities," ACM SIGBED Review—Special Issue on the 10th International Workshop on Real-Time Networks (RTN 2011, vol. 8, No. 4), Dec. 2011, pp. 55-58, XP055363468.

Steiner et al: "Recent IEEE 802 developments and their relevance for the avionics industry," 2014 IEEE/AIAA 33rd Digital Avionics Systems Conference (DASC), IEEE (Oct. 5, 2014) XP032700577.

Kornek-Percin Beatrice et al: "New IMA architecture approach based on IMA resources" 2015 IEEE/AIAA 34th Digital Avionics Systems Conference (DASC), IEEE (Sep. 13, 2015) XP032802038.

Varet et al: "Design and development of an embedded aeronautical router with security capabilities," Integrated Communications, Navigation and Surveillance Conference (ICNS)2012 IEEE (Apr. 24, 2012) pp. EI-I-E1-14, XP032186828.

Christoph Heller et al: "Power-over-Ethernet for avionic networks" Digital Avionics Systems Conference (DASC), 2010 IEEE/AIAA 29th, IEEE, Piscataway, NJ, USA(Oct. 3, 2010), pp. 5.A.2-1-5.A. 2-11, XP031816136.

* cited by examiner

INTERFACE MANAGER DEVICE IN AN AIRCRAFT

FIELD OF THE INVENTION

The present invention relates to an interface manager device in an aircraft, a method implemented by such an interface manager device, and aircraft comprising such interface manager devices.

BACKGROUND OF THE INVENTION

Recent aircrafts are provided with computer equipment items, in order to make it possible to execute applications intended for the pilots of these aircraft and/or for maintenance operatives. These computer equipment items are distinct from computer equipment items intended for the entertainment of passengers of these aircraft. Currently, these computer equipment items are:

computers, displays, servers, embedded avionics control members;

portable PCs (Personal Computers) or tablets or smartphones, called EFB (Electronic Flight Bag) for the pilots or PMAT (Portable MAintenance Terminal) for the maintenance operatives.

Such portable PCs or tablets or smartphones typically contain flight mission data, and applications for using such data or updating them during the flight.

The incorporation of such portables PCs or of such tablets or of such smartphones in an aircraft cockpit possess difficulties. It is first of all necessary to find, or reserve, space for placing such equipment items in the cockpit. It is in particular not suitable in an aircraft to attach by sucker, as would be done in a motor vehicle, a tablet or a smartphone to the windshield. Furthermore, these equipment items, considered as peripheral devices, add to new displays and new control members in addition to those already present in the cockpit.

BRIEF SUMMARY OF THE INVENTION

It may be desirable to overcome these drawbacks of the prior art. It is in particular desirable to provide a solution which is more flexible in terms of incorporation in the context of the aircraft, in terms of installation and in terms of maintenance, and which makes it possible to control the incorporation of peripheral devices in the avionics context. It may also be desirable to provide a solution which is simple to implement and inexpensive.

An embodiment of the invention is an interface manager device intended to interconnect peripheral devices to a network of ACD (Aircraft Control Domain) type or of AISD (Aircraft Information Services Domain) type of an aircraft, the interface manager device comprising: a first data interface suitable for connecting the interface manager device to said network; a first electrical power supply interface suitable for connecting the interface manager device to a general electrical power source; second data interfaces suitable for connecting the peripheral devices and performing data transfers with said peripheral devices; second electrical power supply interfaces suitable for electrically powering the peripheral devices, each second electrical power supply interface being associated with one of said second interfaces. The second data interfaces and the second electrical power supply interfaces are deactivated by default. The interface manager device is configurable via a configuration interface so as to selectively authorize connections between the second data interfaces and the first data interface, and to selectively authorize connections between the second electrical power supply interfaces which are associated with them and the first electrical power supply interface, and to activate the second interfaces concerned. Furthermore, the interface manager device comprises means for propagating a received data packet when said data packet relates to an authorized connection and means for deleting said data packet otherwise.

Thus, by virtue of the interface manager device and of its configuration capability, the incorporation of peripheral devices in the avionics context is flexible, while still being controlled. The interface manager device allows for a flexibility of installation of these peripheral devices and maintenance flexibility, simply and inexpensively.

According to a particular embodiment, the interface manager device comprises interfaces intended to connect said peripheral devices, called combined interfaces, which incorporate both a data transfer function and an electrical power supply function, and which are therefore both second data interfaces and second electrical power supply interfaces which are associated with them.

According to a particular embodiment, the interface manager device is suitable for prohibiting any connection between the second data interfaces.

According to a particular embodiment, the interface manager device is configurable via the configuration interface so as to selectively authorize connections between said second data interfaces, and to selectively authorize connections between the second electrical power supply interfaces which are associated with them and the first electrical power supply interface, and to activate the second interfaces concerned.

According to a particular embodiment, the interface manager device is configurable via the configuration interface so as to allocate an energy budget to each second electrical power supply interface, and the interface manager device comprises means for performing a monitoring of energy consumption of each second electrical power supply interface so as to ensure that the energy budget allocated is respective.

According to a particular embodiment, the interface manager device comprises means for performing an authentication phase when a peripheral device is detected, and the interface manager device comprises means for prohibiting any connection with said peripheral device when the authentication phase fails.

According to a particular embodiment, the interface manager device comprises means for associating, with each data transfer authorized connection, a preemption information item, and the interface manager device comprises means for prohibiting any connection for which the associated preemption information indicate that the period of authorization of said connection has expired.

According to a particular embodiment, the interface manager is installed in a receptacle comprising a sarcophagus suitable for installing therein all or part of the set of peripheral devices.

According to a particular embodiment, the configuration interface is a logic interface of the first data interface, and the interface manager device is configurable through a file transmitted by an authenticated equipment item of said network via said logic interface.

Another object of the present invention is to propose an aircraft equipped with a network of ACD type, a network of AISD type, and a general electrical power source, characterized in that the aircraft comprises an interface manager device as described above.

Another aspect of the present invention relates to a method implemented by an interface manager device interconnecting peripheral devices to a network of ACD type or of AISD type of an aircraft, the interface manager device comprising: a first data interface suitable for connecting the interface manager device to said network; a first electrical power supply interface suitable for connecting the interface manager device to a general electrical power source; second data interfaces suitable for connecting the peripheral devices and performing data transfers with said peripheral devices; second electrical power supply interfaces suitable for electrically powering the peripheral devices, each second electrical power supply interface being associated with one of said second data interfaces. The second data interfaces and the second electrical power supply interfaces are deactivated by default. The interface manager device is configured via a configuration interface so as to selectively authorize connections between the second data interfaces and the first data interface, and to selectively authorize connections between the second electrical power supply interfaces which are associated with them and the first electrical power supply interface, and to activate the second interfaces concerned. Furthermore, when the interface manager device receives a data packet, the interface manager device propagates said data packet when said packet relates to an authorized connection and deletes said data packet otherwise.

Yet another aspect of the present invention relates to a computer program product, which can be stored on a medium and/or downloaded from a communication network, in order to be read by a processor of the interface manager device described above. This computer program comprises instructions for implementing the method mentioned above, when said program is executed by the processor. Another embodiment of the present invention is an information storage medium on which such a computer program is stored.

BRIEF DESCRIPTION OF THE DRAWINGS

The features of the invention mentioned above, and others, will appear more clearly on reading the following description of an exemplary embodiment, said description being given in relation to the attached drawings, in which.

DETAILED DESCRIPTION

Figure 1:
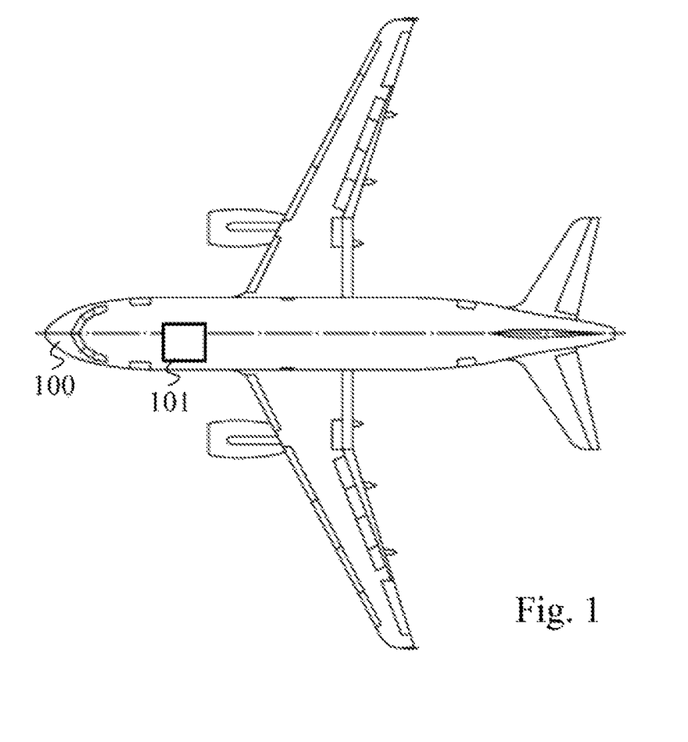
FIG. 1 shows a plan view of an aircraft in which an interface manager device is installed.

FIG. 1 shows, in a plan view, an aircraft 100. The aircraft 100 is provided with a set of computer equipment items intended to provide assistance to the pilot of the aircraft 100 and/or to provide assistance to maintenance operatives of the aircraft 100. More generally, this set of computer equipment items is intended to allow the operation of the aircraft 100. This set of computer equipment items comprises an interface manager device 101, as described hereinbelow.

Figure 2:
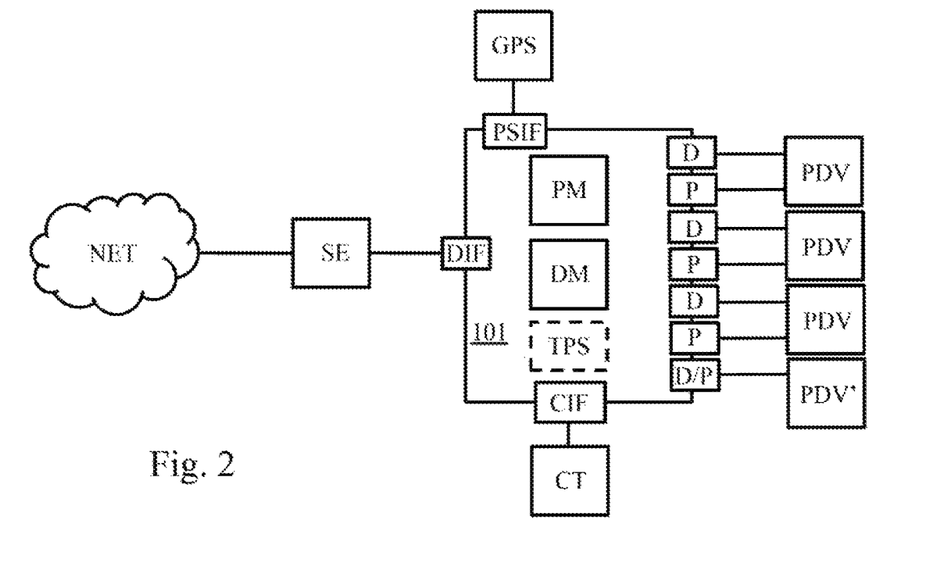
FIG. 2 schematically illustrates an arrangement of the interface manager device in its context of use.

FIG. 2 schematically illustrates an arrangement of the interface manager device 101 in its context of use The interface manager device 101 is intended to be inserted between a network NET of the aircraft 100, and one or more peripheral devices PDV (Peripheral DeVice). The network NET of the aircraft 100 is the network of ACD type of the aircraft 100 or the network of AISD type of the aircraft 100. As a reminder, the network of ACD type is the network whose main functionality is to ensure safe operation of the aircraft 100. The network of ACD type is separate from any other computer infrastructure, including the network of AISD type, by a dedicated reinforced security equipment item SE (Security Equipment), such as, for example, a network diode or a hardware firewall. Indeed, the network of AISD type belongs to the domain of lower level security than the network of ACD type, and is used in the coordination and the connection of different equipment items of the aircraft 100 which are not essential to the safe operation of the aircraft 100.

The network NET of the aircraft 100 therefore interconnects different computer equipment items, such as servers, displays, data storage units, etc., intended to provide, in the cockpit of the aircraft 100, support to the pilot for controlling various equipment items of the aircraft and supervising the operation of these equipment items. The network NET of the aircraft 100 therefore has to be distinguished from any passenger entertainment network of the aircraft 100.

So as to be able to connect the interface manager device 101 to the network NET of the aircraft 100, possibly via the security equipment SE, the interface manager device 101 comprises a data interface DIF (Data InterFace). For example, this data interface DIF is of Ethernet type.

The interface manager device 101 also comprises an electrical power supply interface PSIF (Power Supply InterFace) making it possible to connect the interface manager device 101 to a general power supply to a general electrical power supply GPS (General Power Supply). The interface manager device 101 is thus intended to be inserted between the general electrical power supply GPS and the peripheral device or devices PDV.

So as to be able to connect the peripheral device or devices PDV, the interface manager device 101 comprises a set of data interfaces D, and a set of electrical power supply interfaces P. Each electrical power supply interface P is associated, in a predefined manner, with a data interface D. The interface manager device 101 thus has control of the energy budget and of the data connections with the peripheral device or devices PDV.

It should be noted that the interface manager device 101 can comprise one or more combined interfaces D/P which incorporate both a data transfer function and an electrical power supply function. These combined interfaces D/P are therefore both data interfaces D and electrical power supply interfaces P. Such is, for example, the case of USB (Universal Serial Bus) interfaces of type C or PoE (Power over Ethernet) interfaces. In FIG. 2, a peripheral device PDV' is connected to the interface manager device 101 through such a combined interface D/P.

When the interfaces D, D/P and DIF are of different kinds (e.g. Ethernet versus USB), the interface manager device 101 is suitable for performing encapsulations/de-encapsulations and/or reformattings of data and/or protocol conversions to adapt said data to the connection concerned. For example, it is known that Ethernet to USB adaptations are easy to achieve.

The peripheral devices PDV or PDV' can be data processing devices, such as PC-on-stick or servers, data storage units, wireless access points, etc.

The interface manager device 101 comprises a particular interface, called configuration interface CIF, to make it possible to connect a configuration terminal CT. The configuration terminal CT is then used to configure the interface manager device 101 and activate/deactivate connections between the interfaces of the interface manager device 101. In other words, the interface manager device 101 is configurable, via the configuration interface CIF, so as to selectively authorise connections between the interfaces D and the data interface DIF, and to selectively authorize connections between the associated interfaces P and the electrical power supply interface PSIF, and to activate the interfaces D and P concerned. Furthermore, the interface manager device 101 is configurable, via the configuration interface CIF, so as to selectively authorize connections between the combined interfaces D/P, on the one hand, and the data interface DIF and the electrical power supply interface PSIF, on the other hand, and to activate the D/P interfaces concerned.

In a particular embodiment, the configuration interface CIF is a logic interface of the data interface DIF. An equipment item on the network NET, for example on the network of ACD type, transmits to the interface manager device 101 a configuration file via this logic interface of the data interface DIF, after execution of an authentication phase between said equipment item on the network NET and the interface manager device 101. The configuration file thus supplied to the interface manager device 101 contains descriptors of the connections to be activated.

By default, the interfaces D, P and D/P are deactivated, which means that connecting a peripheral device PDV or PDV' to the interface manager device 101 has no effect. Allowing data transfers from or to a peripheral device PDV or PDV', and electrically powering such a peripheral device PDV or PDV', requires a prior configuration of the interface manager device 101. This prior configuration is done through the CIF configuration interface. For example, the configuration interface CIF is a dedicated Ethernet interface or an interface with a proprietary connection system. In a variant embodiment, the configuration interface CIF is a user interface incorporated in the interface manager device 101.

The configuration interface CIF can be associated with a dedicated electrical power supply interface, so as to make it possible to power the configuration terminal CT, in which case this dedicated electrical power supply interface has its own energy budget.

The interface manager device 101 comprises an electrical power supply management function PM (Power Management), and a data management function DM (Data Management). The electrical power supply management PM and data management DM functions are thus configured via the configuration interface CIF. In a particular embodiment, the electrical power supply management PM and data management DM functions use configuration tables, as described hereinbelow in relation to FIGS. 4A and 4B.

When the interface manager device 101 is configured via the configuration interface CIF, the security equipment item SE is also configured accordingly, and so as to authorize the data connections between the peripheral devices PDV or PDV' concerned and the network NET of the aircraft 100. These data connections ensure, for example, that the pilot of the aircraft 100 will be able to control said peripheral devices PDV or PDV' using a keyboard and/or a track ball of the cockpit of the aircraft 100. These data connections ensure, for example, that the pilot of the aircraft 100 will be able to display, on a screen of the cockpit of the aircraft 100, data from said peripheral devices PDV or PDV'.

The interface manager device 101 can prohibit any connection between the peripheral devices PDV or PDV' themselves. In a particular embodiment, the interface manager device 101 can however authorize such connections, for example to make it possible to perform a backup of data from processing peripheral devices, such as a PC-on-stick or a server, to a data storage peripheral device, such as a hard disc HDD (Hard Disk Drive). In which case, the interface manager device 101 selectively authorizes connections between the associated electrical power supply interfaces P and the electrical power supply interface PSIF, and activates the interfaces D and P concerned. The same would apply with the combined interfaces D/P.

In a particular embodiment, the interface manager device 101 includes a temporary electrical power supply TPS (Temporary Power Supply) to make it possible to continue to provide the electrical power supply provided for the peripheral devices TD and TD' when micro-outages occur on the general electrical power supply GPS. The temporary electrical power supply TPS is for example a supercapacitor.

Figure 3:
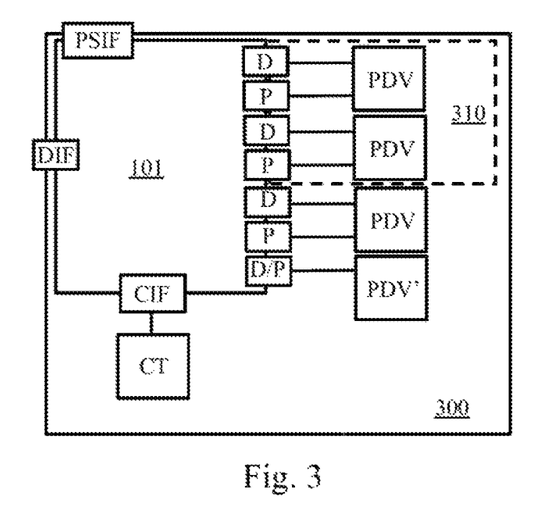
FIG. 3 schematically illustrates an additional arrangement of the interface manager device in its context of use.

FIG. 3 schematically illustrates an additional arrangement of the interface manager device 101 in its context of use.

The interface manager device 101 is included in a receptacle 300. The receptacle 300 is such that the interfaces PSIF and DIF are accessible from outside, that is to say that the receptacle 300 is suitable for connecting the interface manager device 101 to the general electrical power supply GPS and to the network NET of the aircraft 100, possibly via the security equipment item SE. Other interfaces, out of the interfaces D, P and D/P, can also be accessible from outside (for example an interface D/P of USB type intended to facilitate the connection of a simple USB stick).

The receptacle 300 is preferentially arranged to allow the peripheral devices PDV and PDV' to be installed inside said receptacle 300. In particular, the receptacle 300 can include chocks, slugs and collars, or any other mechanics for holding in position, to allow the peripheral devices PDV and PDV' to be fixed inside said receptacle 300.

In a particular embodiment, the receptacle 300 contains a sarcophagus 310 suitable for installing therein all or some of the set of the peripheral devices PDV and PDV'. That means that the sarcophagus 310 is such that all or some of the set of the interfaces D, P and D/P is accessible from inside the sarcophagus 310, that is to say that the sarcophagus 310 is suitable for connecting one or more peripheral devices PDV and/or PDV' to the interface manager device 101. Such a sarcophagus 310 creates a Faraday cage, which makes it possible to install therein peripheral devices PDV and PDV' which would not be qualified for avionics use. The peripheral devices PDV and PDV' which would be qualified for avionics use can, for their part, be installed in the receptacle 300, outside of the sarcophagus 310.

Figure 4A:
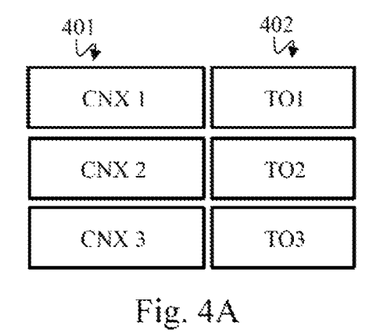
FIGS. 4A and 4B schematically illustrate configuration tables of the interface manager device, in a particular embodiment.
Figure 4B:
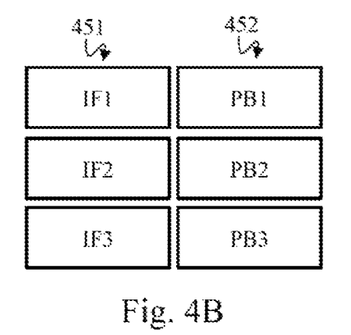

FIGS. 4A and 4B schematically illustrated configuration tables of the interface manager device 101, in a particular embodiment. More specifically, FIG. 4A represents a first configuration table used by the data management function DM, and FIG. 4B represents a second configuration table used by the electrical power supply management function PM. The first and second configuration tables are filled via the configuration interface CIF.

The first configuration table comprises a first column 401 including descriptors of authorized connections through the interface manager device 101. For example, the descriptors of connections in question comprise a connection identifier, a logic interface identifier making it possible to access the network NET of the aircraft 100, an identifier of the (physical) interface D or D/P with which the connection is authorized and possibly a logic interface identifier within the (physical) interface D or D/P. Other information items can be contained in these descriptors, such as, for example, information on maximum bit rates respectively authorized via said connections. Any connection not listed in the first configuration table is prohibited by the data management function DM. This aspect is detailed hereinbelow in relation to FIG. 8.

As already stated, the interface manager device 101 can prohibit any connection between the peripheral devices PDV or PDV' themselves. In this case, the first configuration table makes it possible only to declare connections between the data interface DIF, on the one hand, and the data interfaces D and/or the combined interfaces D/P, on the other hand.

As an illustration, FIG. 4A presents three descriptors of authorized connections CNX1, CNX2 and CNX3. By default, before configuration via the configuration interface CIF, the first configuration table is empty.

In a particular embodiment, the first configuration table comprises a second column 402 including, in association with the descriptors of authorized connections, preemption information items for said connections. Any connection listed in the first configuration table and for which the preemption information indicates that the period of authorization of said connection has expired is prohibited by the data management function DM. This aspect is also detailed hereinbelow in relation to FIG. 8.

As an illustration, FIG. 4A presents three preemption information items TO1, TO2 and TO3 correlated with the three descriptors of authorized connections CNX1, CNX2 and CNX3.

The second configuration table comprises a first column 451 including respective identifiers of the (physical) interfaces P or D/P. The set of the (physical) interfaces P or D/P is thus listed in the second configuration table.

The second configuration table preferentially comprises a second column 452 including, in association with the respective identifiers of the (physical) interfaces P or D/P, information on the energy budget allocated to each of the (physical) interfaces P or D/P. The electrical power supply management function PM ensures that the energy budgets allocated to the (physical) interfaces P or D/P are respective. The interface manager device 101 can, to do this, use electrical power supply blocks that are limited in current, by setting the current limit delivered in accordance with the energy budget allocated for the interface concerned. In a particular embodiment, the electrical power supply management function PM cuts the electrical power supply of the (physical) interfaces P or D/P concerned when the energy budget allocated is exceeded beyond a certain amplitude limit and/or beyond a certain time limit. This aspect is detailed hereinbelow in relation to FIG. 9. The electrical power supply management function PM can also backup, in an internal journal, accessible via the configuration interface CIF, an overshoot of the allocated energy budget.

As an illustration, FIG. 4B present three identifiers IF1, IF2 and IF3 of (physical) interfaces P or D/P correlated with three respective allocated energy budget information items PB1, PB2 and PB3. By default, before configuration via the configuration interface CIF, the second column 452 of the second configuration table comprises only nil values.

As a variant, the second configuration table indicates only the electrical P and combined D/P power supply interfaces which must be activated, and which correspond to the data D and combined D/P interfaces which are involved in connections declared in the first configuration table. In this case, the interface manager device 101 does not manage energy budget.

Thus, by virtue of the first and second configuration tables, the interface manager device 101 selectively authorize certain connections through said interface manager device 101 and controls the energy envelope (and therefore the thermal envelope) granted to the peripheral devices PDV and PDV'.

Figure 5:
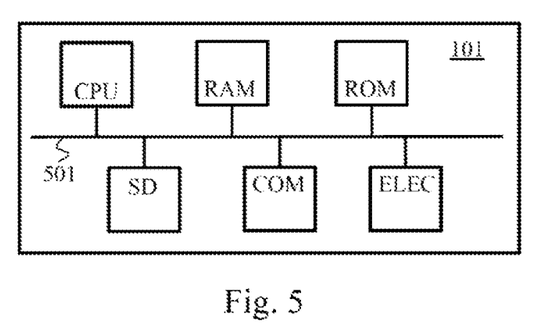
FIG. 5 schematically illustrates an example of internal hardware architecture of the interface manager device.

FIG. 5 schematically illustrates an example of internal hardware architecture of the interface manager device 101. The interface manager device 101 then comprises, linked by a communication bus 501: a processor or CPU (Central Processing Unit); a random access memory RAM; a read-only memory ROM; a storage unit, such as a hard disc HDD, or a storage medium reader, such as an SD (Secure Digital) card reader or an electrically-erasable programmable read-only memory EEPROM, such as a flash memory; a set of communication interfaces COM making it possible to connect, on one side, the interface manager device 101 to the network NET of the aircraft 100, possibly via the security equipment item SE, and on the other side, one or more peripheral devices PDV; and a set of electrical power supply interfaces ELEC allowing the interface manager device 101, on one side, to receive the general electrical power supply GPS and, on the other side, to electrically power the peripheral device or devices PDV.

It should be noted, as already mentioned, that some communication interfaces COM can incorporate an electrical power supply function for powering the peripheral device PDV' connected to the interface manager device 101 through said communication interface.

The processor CPU is capable of executing instructions loaded into the RAM memory from the ROM memory or from the EEPROM, from an external memory (not represented), from a storage medium (such as an SD card), or from a communication network (not represented). When the interface manager device 101 is powered up, the processor CPU is capable of reading instructions from the RAM memory and of executing them. These instructions form a computer program causing the implementation, by the processor CPU, of all or part of the algorithms and of the steps described hereinbelow in relation to FIGS. 6 to 9.

All or part of the algorithms and of the steps described hereinbelow in relation to FIGS. 6 to 9 can thus be implemented in software form by execution of a set of instructions by a programmable machine, for example a DSP (Digital Signal Processor) or a microcontroller, or be implemented in hardware form by a dedicated machine or component, for example an FPGA (Field-Programmable Gate Array) or ASIC (Application-Specific Integrated Circuit) component. Generally, the interface manager device 101 comprises electronic circuitry suitable for implementing, in software and/or hardware form, the algorithms and the steps described hereinbelow in relation to FIGS. 6 to 9.

Figure 6:
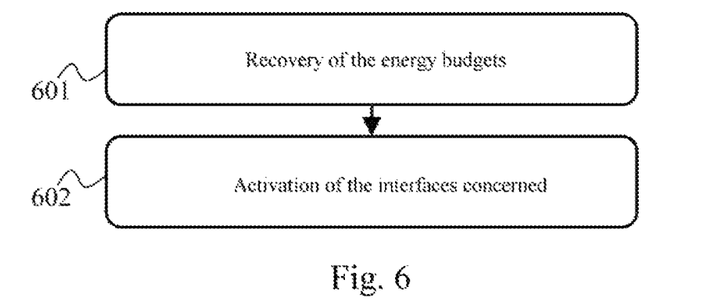
FIG. 6 schematically illustrates a flow diagram of an algorithm of initialisation of the interface manager device, following a configuration or a powering up of the interface manager device.

FIG. 6 schematically illustrates a flow diagram of an algorithm of initialization of the interface manager device 101, following a configuration of the interface manager device 101 via the configuration interface CIF or a powering-up of the interface manager device 101. At the start of the algorithm of FIG. 6, none of the interfaces D, P and D/P is activated.

In a step 601, the interface manager device 101 recovers information on energy budgets assigned to the interfaces to which the peripheral devices PDV or PDV' are likely to be connected, namely the electrical power supply interfaces P and the combined interfaces D/P. These information items are located in the second configuration table, a particular embodiment of which has been represented in relation to FIG. 4B, following the configuration of the interface manager device 101 via the configuration interface CIF. The data management function DM then requests them from the electrical power supply management function PM.

In a step 602, the interface manager device 101 activates the combined interfaces D/P which show a non-zero energy budget, and the data interfaces D which are associated with the electrical power supply interfaces P which show a non-zero energy budget. The data interfaces D which are associated with the electrical power supply interfaces P which show a zero energy budget are thus not activated. This aspect is implemented by the data management function DM. Furthermore, the interface manager device 101 activates the electrical power supply interfaces P which show a non-zero energy budget. The electrical power supply interfaces P which show a zero energy budget are thus not activated. This aspect is implemented by the electrical power supply management function PM.

Figure 7:
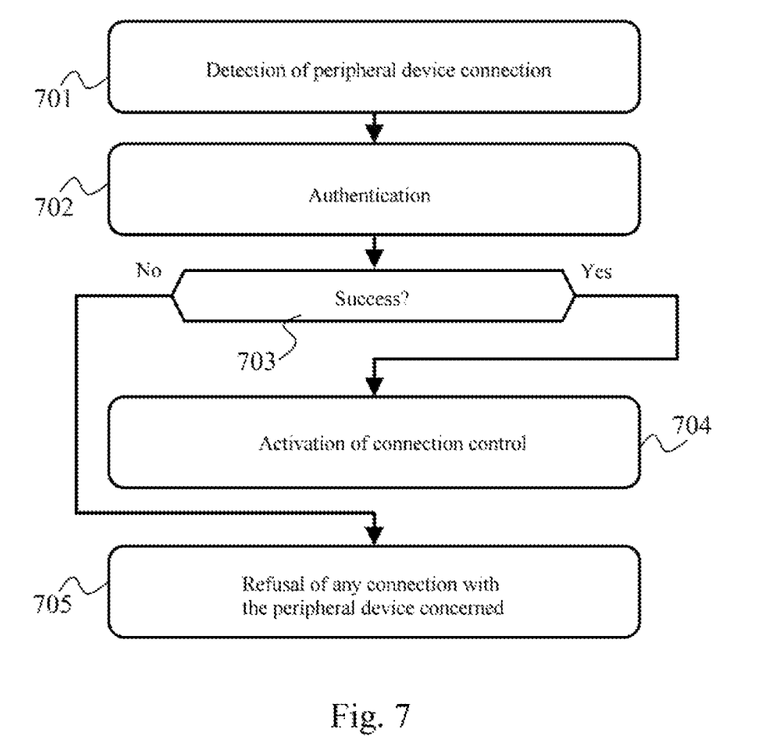
FIG. 7 schematically illustrates a flow diagram of an algorithm for relating the interface manager device with a peripheral device, in a particular embodiment.

FIG. 7 schematically illustrates a flow diagram of an algorithm of correlating the interface manager device 101 with a peripheral device PDV or PDV', in a particular embodiment. The algorithm of FIG. 7 is more particularly implemented by the data management function DM.

In a step 701, the interface manager device 101 detects a peripheral device connection on a data interface D, or on a combined interface D/P, which has previously been activated (see FIG. 6).

In a step 702, the interface manager device 101 performs an authentication phase with the detected peripheral device. This authentication phase is based on authentication keys pre-stored in the interface manager device 101. The different authentication keys can be associated with the interfaces D, D/P. That makes it possible to dedicate the data D and combined D/P interfaces to distinct purposes (or distinct partners). Only a peripheral device PDV or PDV' having appropriate authentication keys can thus hope to benefit from one or more connections through the interface manager device 101. Any other peripheral device thus connected fails in the authentication phase.

In a step 703, the interface manager device 101 checks whether the authentication phase has been completed successfully. If such is the case, a step 704 is performed in which the interface manager device 101 actives a connection control mechanisms for said detected peripheral device, as described hereinbelow in relation to FIG. 8; otherwise, in a step 705, the interface manager device 101 refuses any connection (through said interface manager device 101) for said detected peripheral device.

The algorithm of FIG. 7 makes it possible, by virtue of the inclusion of the authentication phase, to ensure that only peripheral devices PDV or PDV' that are expected are connected to the data interfaces D and to the combined interfaces D/P. Thus, if for example a data interface D and its associated electrical power supply interface P are intended to connect a peripheral device PDV provided by an airline (or by an aircraft constructor) to which specific authentication keys have been supplied, there is an assurance that a peripheral device brought by a third party will not have access to the network NET of the aircraft through said data interface D.

Figure 8:
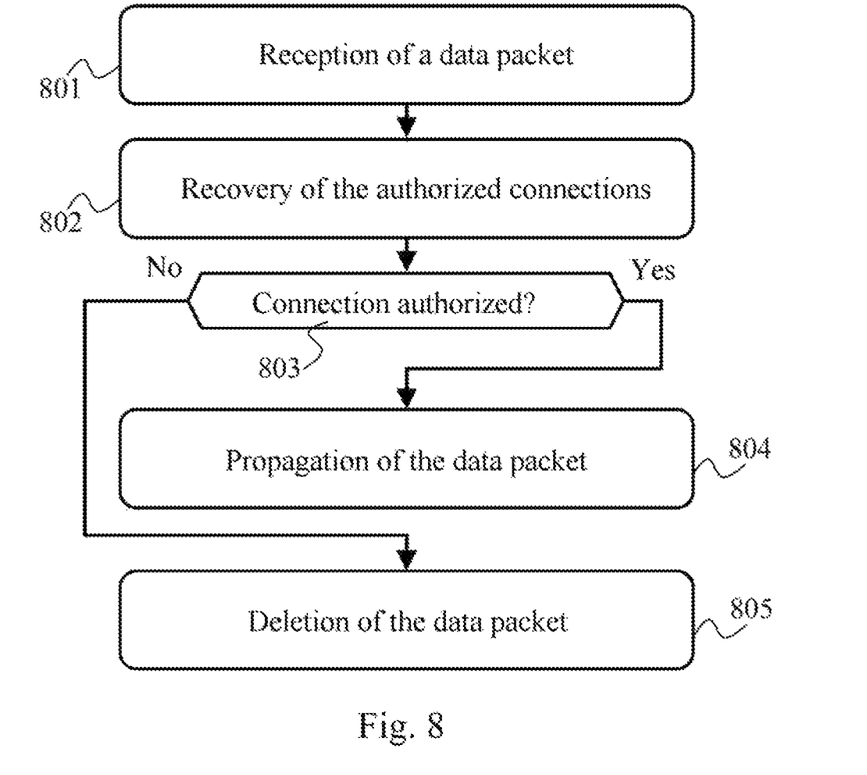
FIG. 8 schematically illustrates a flow diagram of an algorithm for managing data packet transfers for data packet transfer management by the interface manager device.

FIG. 8 schematically illustrates a flow diagram of an algorithm of data packet transfer management by the interface manager device 101, in a particular embodiment. The algorithm of FIG. 8 is more particularly implemented by the data management function DM.

In a step 801, the interface manager device 101 receives a data packet via an interface D, D/P previously activated or via the interface DIF.

In a step 802, the interface manager device 101 recovers information items representative of the connections authorized via the interface manager device 101. These information items are located in the first configuration table, a particular embodiment of which has been presented in relation to FIG. 4A, following the configuration of the interface manager device 101 via the configuration interface CIF.

In a step 803, the interface manager device 101 checks whether the data packet received corresponds to a connection that is authorized through the interface manager device 101. For example, the data packet identifies the source of said data packet and the recipient of said data packet, and the interface manager device 101 is therefore able to determine whether the received packet corresponds to a connection that is authorized or not.

It should be noted that, in a particular embodiment already described, the authorized connections are associated with preemption information items. When the preemption information item associated with a connection indicates that the period of authorization of said connection has expired, said connection is then considered to be non-authorized. The same applies, in another particular embodiment already described, when the packet is from a non-authenticated peripheral device or intended for a non-authenticated peripheral device.

If the data packet received corresponds to an authorized connection, a step 804 is performed, in which the interface manager device 101 propagates the received data packet via said connection; otherwise, as step 805 is performed, in which the interface manager device 101 deletes the received data packet, that is to say that the interface manager device 101 does not propagate the received data packet.

The interface manager device 101 can also backup, in an internal log, accessible via the configuration interface CIF, any transmission of data attempting to use a connection that is not authorized through said interface manager device 101.

The algorithm of FIG. 8 thus makes it possible to ensure that a peripheral device PDV or PDV' can only access the computer equipment items of the aircraft 100 which are authorized to it and for which the corresponding connections have been previously configured in the interface manager device 101.

Figure 9:
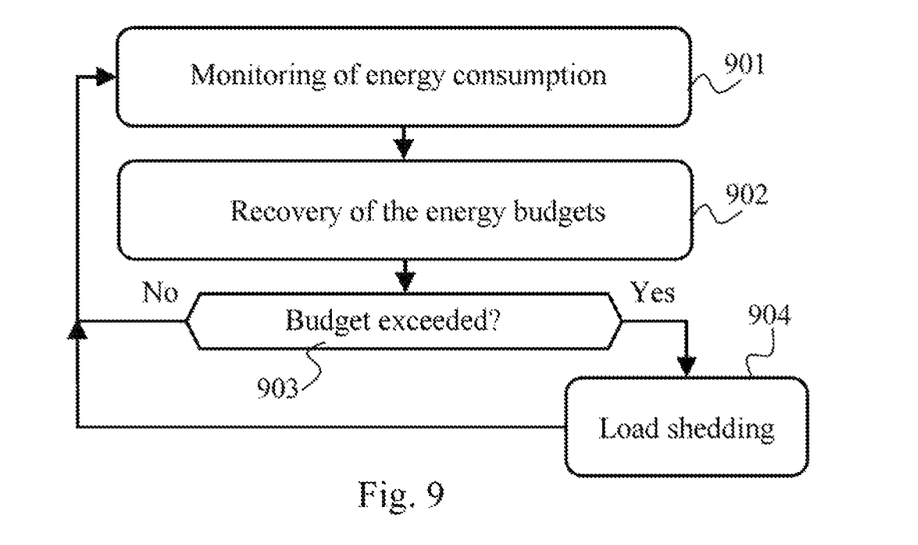
FIG. 9 schematically illustrates a flow diagram for electrical power supply management by the interface manager device.

FIG. 9 schematically illustrates a flow diagram of an algorithm of electrical power supply management by the interface manager device 101. The algorithm of FIG. 9 is more particularly implemented by the electrical power supply management function PM.

In a step 901, the interface manager device 101 performs a monitoring of energy consumption of the electrical power supply interfaces P and of the combined interfaces D/P that have been activated (see FIG. 6). For this, the interface manager device 101 uses, for example, Hall effect probes.

In a step 902, the interface manager device 101 recovers information on energy budgets assigned to the interfaces to which peripheral devices PDV or PDV' are likely to be connected, namely the electrical power supply interfaces P and the combined interfaces D/P. These information items are located in the second configuration table, a particular embodiment of which has been presented in relation to FIG. 4B, following the configuration of the interface manager device 101 via the configuration interface CIF.

In a step 903, the interface manager device 101 checks whether the monitoring of energy consumption shows an energy budget overshoot for at least one activated electrical power supply interface P and/or for at least one activated combined interface D/P. Thus, when the allocated energy budget is exceeded beyond a certain amplitude limit (with a margin which can be zero) and/or beyond a certain time limit, the interface manager device 101 applies a reaction measure. If such is the case, a step 904 is performed; otherwise, the interface manager device 101 continues monitoring energy consumption by reiterating the step 901.

In the step 904, the interface manager device 101 performs a load-shedding by cutting the electrical power of each electrical power supply interface P concerned in the energy budget overshoot and of each combined interface D/P concerned in the energy budget overshoot. The interface manager device 101 can also backup, in an internal log, accessible via the configuration interface CIF, any allocated energy budget overshoot.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interface manager device configured to interconnect peripheral devices to a network of Aircraft Control Domain ("ACD") type or of Aircraft Information Services Domain ("AISD") type of an aircraft, the interface manager device comprising:
   a first data interface configured for connecting the interface manager device to said network;
   a first electrical power supply interface configured for connecting the interface manager device to a general electrical power source;
   second data interfaces configured for connecting the peripheral devices and performing data transfers with said peripheral devices;
   second electric power supply interfaces configured for electrically powering the peripheral devices, each second electrical power supply interface being associated in a predefined manner with one of said second data interfaces;
   wherein the second data interfaces and the second electrical power supply interfaces are deactivated by default,
   wherein the interface manager device comprises a configuration interface for filling a first configuration table of a data management device of the interface manager device and a second configuration table of an electrical power supply management function of the interface manager device,
   wherein the interface manager device is configurable by virtue of the first and second configuration tables via the configuration interface so as to selectively authorize connections between the second data interfaces and the first data interface, and to selectively authorize connections between the second electrical power supply interfaces which are associated with them and the first electrical power supply interface, and to activate the second interfaces concerned, and
   wherein the interface manager device comprises means for propagating a data packet received via one said data interface, when said data packet relates to a connection authorized in the first configuration table following a configuration via the configuration interface and means for deleting said data packet otherwise.

2. The interface manager device according to claim 1, wherein the interface manager device comprises interfaces configured to connect said peripheral devices, called combined interfaces, which incorporate both a data transfer function and an electrical power supply function, and which are therefore both second data interfaces and second electrical power supply interfaces which are associated with them.

3. The interface manager device according to claim 1, wherein the interface manager device is configured for prohibiting any connection between the second data interfaces (D).

4. The interface manager device according to claim 1, wherein the interface manager device is configurable via the configuration interface so as to selectively authorize connections between said second data interfaces, and to selectively authorize connections between the second electrical power supply interfaces which are associated with them and the first electrical power supply interface, and to active the second interfaces concerned.

5. The interface manager device according to claim 1, wherein the interface manager device is configurable via the configuration interface so as to allocate an energy budget to each second electrical power supply interface, and
   wherein the interface manager device comprises means for performing a monitoring of energy consumption of each second electrical power supply interface so as to ensure that the energy budget allocated is respective.

6. The interface manager device according to claim 1, wherein the interface manager device comprises means for performing an authentication phase when a peripheral device is detected, and
   wherein the interface manager device comprises means for prohibiting any connection with said peripheral device when the authentication phase fails.

7. The interface manager device according to claim 1, wherein the interface manager device comprises means for associating, in the first configuration table, with each data transfer authorized connection, a preemption information item, and wherein the interface manager device comprises means for prohibiting any connection for which the associated preemption information indicates that the period of authorization of said connection has expired.

8. The interface manager device according to claim 1, wherein the interface manager device is installed in a receptacle comprising a sarcophagus creating a Faraday cage, the sarcophagus being suitable for installing therein all or part of the set of peripheral devices.

9. The interface manager device according to claim 1, wherein the configuration interface is a logic interface of the first data interface, and
wherein the interface manager device is configurable through a file transmitted by an authenticated equipment item of said network via said logic interface.

10. An aircraft equipped with a network of Aircraft Control Domain ("ACD") type and a network of Aircraft Information Services Domain ("AISD") type, and a general electrical power source, further comprising an interface manager device comprising:
a first data interface configured for connecting the interface manager device to said network;
a first electrical power supply interface configured for connecting the interface manager device to a general electrical power source;
second data interfaces configured for connecting the peripheral devices and performing data transfers with said peripheral devices;
second electric power supply interfaces configured for electrically powering the peripheral devices, each second electrical power supply interface being associated in a predefined manner with one of said second data interfaces;
wherein the second data interfaces and the second electrical power supply interfaces are deactivated by default,
wherein the interface manager device comprises a configuration interface for filling a first configuration table of a data management device of the interface manager device and a second configuration table of an electrical power supply management function of the interface manager device,
wherein the interface manager device is configurable by virtue of the first and second configuration tables via the configuration interface so as to selectively authorize connections between the second data interfaces and the first data interface, and to selectively authorize connections between the second electrical power supply interfaces which are associated with them and the first electrical power supply interface, and to activate the second interfaces concerned, and
wherein the interface manager device comprises means for propagating a data packet received via one said data interface, when said data packet relates to a connection authorized in the first configuration table following a configuration via the configuration interface and means for deleting said data packet otherwise.

11. A method implemented by an interface manager device interconnecting peripheral devices to a network of Aircraft Control Domain ("ACD") type or of Aircraft Information Services Domain ("AISD") type of an aircraft, the interface manager device comprising:
a first data interface suitable for connecting the interface manager device to said network;
a first electrical power supply interface suitable for connecting the interface manager device to a general electrical power source;
second data interfaces suitable for connecting the peripheral devices and performing data transfers with said peripheral devices;
second electrical power supply interfaces suitable for electrically powering the peripheral devices, each second electrical power supply interface being associated in a predefined manner with one of said second data interfaces;
the second data interfaces and the second electrical power supply interfaces being deactivated by default,
wherein, the interface manager device comprises a configuration interface for filling a first configuration table of a data management function of the interface manager device and a second configuration table of an electrical power supply management function of the interface manager device,
the interface manager device is configured by virtue of the first and second configuration tables via the configuration interface so as to selectively authorize connections between the second data interfaces and the first data interface, and to selectively authorize connections between the second electrical power supply interfaces which are associated with them and the first electrical power supply interface, and to activate the second interfaces concerned,
and wherein, when the interface manager device receives a data packet via one said data interface, the interface manager device propagates said data packet when said packet relates to a connection authorized in the first configuration table following a configuration via the configuration interface and deletes said data packet otherwise.

12. A non-transitory storage medium, storing a computer program comprising instructions driving an execution, by an interface manager device of an aircraft, of a method, when said instructions are executed by a processor of said interface manager device, the method implemented by the interface manager device interconnecting peripheral devices to a network of Aircraft Control Domain ("ACD") type or of Aircraft Information Services Domain ("AISD") type of an aircraft, the interface manager device comprising:
a first data interface suitable for connecting the interface manager device to said network;
a first electrical power supply interface suitable for connecting the interface manager device to a general electrical power source;
second data interfaces suitable for connecting the peripheral devices and performing data transfers with said peripheral devices;
second electrical power supply interfaces suitable for electrically powering the peripheral devices, each second electrical power supply interface being associated in a predefined manner with one of said second data interfaces;
the second data interfaces and the second electrical power supply interfaces being deactivated by default,
wherein, the interface manager device comprises a configuration interface for filling a first configuration table of a data management function of the interface manager device and a second configuration table of an electrical power supply management function of the interface manager device,
the interface manager device is configured by virtue of the first and second configuration tables via the configuration interface so as to selectively authorize connections between the second data interfaces and the first data interface, and to selectively authorize connections between the second electrical power supply interfaces which are associated with them and the first electrical power supply interface, and to activate the second interfaces concerned, and wherein, when the interface manager device receives a data packet via one said data interface, the interface manager device propagates said data packet when said packet relates to a connection authorized in the first configuration table following a configuration via the configuration interface and deletes said data packet otherwise.

* * * * *